United States Patent
Birk et al.

(10) Patent No.: US 7,016,101 B2
(45) Date of Patent: Mar. 21, 2006

(54) SCANNING MICROSCOPE AND OPTICAL ELEMENT

(75) Inventors: Holger Birk, Meckesheim (DE); Johann Engelhardt, Bad Schoenborn (DE)

(73) Assignee: Leica Microsystems Heidelberg GmbH, Mannheim (DE)

(*) Notice: Subject to any disclaimer, the term of this patent is extended or adjusted under 35 U.S.C. 154(b) by 0 days.

(21) Appl. No.: 11/012,523

(22) Filed: Dec. 15, 2004

(65) Prior Publication Data

US 2005/0099673 A1 May 12, 2005

Related U.S. Application Data

(62) Division of application No. 10/207,428, filed on Jul. 29, 2002, now Pat. No. 6,850,358.

(30) Foreign Application Priority Data

Jul. 30, 2001 (DE) ................................ 101 37 154

(51) Int. Cl.
    *G02F 1/33* (2006.01)

(52) U.S. Cl. ...................... 359/305; 359/285; 359/368; 359/382

(58) Field of Classification Search ................ 359/305, 359/285, 307, 368, 371, 308, 385–389, 618, 359/638, 640, 831, 833
See application file for complete search history.

(56) References Cited

U.S. PATENT DOCUMENTS

| 3,632,187 A | 1/1972 | Habegger ................... 350/150 |
| 4,572,614 A | 2/1986 | Lisfeld et al. .............. 350/315 |
| 5,861,980 A | 1/1999 | Ono .......................... 359/341 |
| 6,364,831 B1 | 4/2002 | Crowley ...................... 600/175 |
| 6,510,001 B1 * | 1/2003 | Engelhardt et al. ......... 359/385 |
| 6,525,812 B1 | 2/2003 | Hartmann et al. .......... 356/318 |
| 6,618,178 B1 | 9/2003 | Engelhardt .................. 359/201 |

FOREIGN PATENT DOCUMENTS

| DE | 83 08 331 | 6/1983 |
| DE | 44 04 186 | 11/1994 |
| DE | 198 27 140 | 12/1999 |
| DE | 198 59 314 | 6/2000 |
| DE | 199 06 757 | 12/2000 |
| DE | 199 44 355 | 3/2001 |
| EP | 1 085 362 | 3/2001 |

* cited by examiner

*Primary Examiner*—Ricky L. Mack
*Assistant Examiner*—Brandi N. Thomas
(74) *Attorney, Agent, or Firm*—Davidson, Davidson & Kappel, LLC

(57) ABSTRACT

A scanning microscope that defines an illumination beam path and a detection beam path, having an objective that is arranged in both the illumination beam path and the detection beam path, is disclosed. The scanning microscope is characterized by an interchangeable module that is also arranged in the illumination beam path and a [sic] detection beam path and that separates the illumination beam path and detection beam path at a fixed angular relationship to one another and comprises at least a first acoustooptical component. Also disclosed is an optical element having at least three ports.

10 Claims, 5 Drawing Sheets

SCANNING MICROSCOPE AND OPTICAL ELEMENT

CROSS REFERENCE TO RELATED APPLICATIONS

This application is a division of prior application Ser. No. 10/207,428, filed Jul. 29, 2002 now U.S. Pat. No. 6,850,358, which claims priority to German patent application No. 101 37 154.3-42, filed Jul. 30, 2001. Both of these applications are hereby incorporated by reference herein.

FIELD OF THE INVENTION

The invention concerns a scanning microscope that defines an illumination beam path and a detection beam path, having an objective that is arranged in both the illumination beam path and the detection beam path.

The invention furthermore concerns an optical element having at least three ports, such that at one port an illuminating light beam can be coupled in, at a further port the illuminating light beam can be coupled out and a detected light beam can be coupled in, and at a third port the detected light beam can be coupled out.

BACKGROUND OF THE INVENTION

In scanning microscopy, a specimen is illuminated with a light beam in order to observe the detected light, constituting reflected or fluorescent light, emitted by the specimen. The focus of an illuminating light beam is moved in a specimen plane by means of a controllable beam deflection device, generally by tilting two mirrors; the deflection axes are usually perpendicular to one another, so that one mirror deflects in the X direction and the other in the Y direction. Tilting of the mirrors is brought about, for example, by means of galvanometer positioning elements. The power level of the detected light coming from the specimen is measured as a function of the position of the scanning beam.

The positioning elements are usually equipped with sensors to ascertain the present mirror position. The illuminating light is coupled in via a beam splitter. The fluorescent or reflected light coming from the specimen passes through the beam splitter and then arrives at the detectors.

In confocal scanning microscopy specifically, a specimen is scanned in three dimensions with the focus of a light beam.

A confocal scanning microscope generally comprises a light source, a focusing optical system with which the light of the source is focused onto an aperture pinhole (called the "excitation pinhole'), a beam splitter, a beam deflection device for beam control, a microscope optical system, a detection pinhole, and the detectors for detecting the detected or fluorescent light. The illuminating light is coupled in via a beam splitter. The fluorescent or reflected light coming from the specimen travels by way of the beam deflection device back to the beam splitter, passes through it, and is then focused onto the detection pinhole behind which the detectors are located. This detection arrangement is called a "descan" arrangement. Detected light that does not derive directly from the focus region takes a different light path and does not pass through the detection pinhole, so that a point datum is obtained which results, by sequential scanning of the specimen, in a three-dimensional image. A three-dimensional image is usually achieved by acquiring image data in layers.

The published German Patent Application DE 199 06 757 A1 discloses an optical arrangement in the beam path of a light source suitable for fluorescence excitation, preferably in the beam path of a confocal laser scanning microscope, having at least one spectrally selective element for coupling the excitation light of at least one light source into the microscope and for blocking the excitation light or excitation wavelength scattered and reflected at the specimen out of the light coming from the specimen via the detection beam path. For variable configuration with very simple design, the arrangement is characterized in that excitation light of differing wavelengths can be blocked out by the spectrally selective element.

Alternatively, an optical arrangement of this kind is characterized in that the spectrally selective element can be set to the excitation wavelength that is to be blocked out. Also stated in the aforesaid document is the fact that the spectrally selective element can be embodied as an acoustooptical tunable filter (AOTF) or an acoustooptical deflector (AOD).

The published German Patent Application DE 198 59 314 A1 discloses an arrangement of a light-diffracting element for the separation of excitation light and emitted light in a microscope beam path, preferably in a confocal microscope, and in particular in a laser scanning microscope, in which context both the excitation light and the emitted light pass through the light-diffracting element and at least one wavelength of the excitation light is influenced by diffraction, while other wavelengths emitted by the specimen pass through the element uninfluenced and are thereby spatially separated from the excitation light. The arrangement contains an AOTF.

The known scanning microscopes have the advantage of spectral flexibility as compared to scanning microscopes in which the separation of illuminating light and detected light is implemented with a beam splitter, since the acoustooptical component can be set, by activation with sound waves of differing frequencies, to any desired optical wavelength for illuminating light or detected light. In addition, with these scanning microscopes the spectral separation is many times better than in scanning microscopes having beam splitters. The use of scanning microscopes having a beam splitter (which can be embodied, for example, as a neutral splitter) is preferred for reflective specimens, because of elevated light power losses in the acoustooptical components. Scanning microscopes having beam splitters are moreover considerably more economical.

Commercial scanning microscopes usually contain a microscope stand such as the one also used in conventional light microscopy. As a rule, confocal scanning microscopes in particular can also be used as conventional light microscopes. In conventional fluorescent incident-light microscopy, that portion of the light of a light source, for example an arc lamp, that comprises the desired wavelength region for fluorescent excitation is coupled into the microscope beam path by means of a color filter (called the "excitation filter"). Coupling into the beam path of the microscope is accomplished by means of a dichroic beam splitter that reflects the excitation light to the specimen while it allows the fluorescent light proceeding from the specimen to pass largely unimpeded. The excitation light scattered back from the specimen is held back with a blocking filter that is nevertheless transparent to the fluorescent radiation. Optimal combination of mutually coordinated filters and beam splitters into an easily interchangeable modular filter block has been usual for some time. The filter blocks are usually arranged in a revolving turret within the microscope, as part of so-called fluorescent incident-light illuminators, thus making possible rapid and easy interchange. A fluorescence device for inverted microscopes which contains a revolving mount for the reception of multiple fluorescence cubes which is mounted rotatably on a drawer is described e.g. in German Patent DE 44 04 186 C1.

SUMMARY OF THE INVENTION

It is therefore the object of the invention to propose a scanning microscope that is universally usable and that offers the advantages of the various known scanning microscopes. The scanning microscope is also intended to be retrofittable without, or in any case with little, alignment effort.

The above object is achieved by a scanning microscope comprising: an objective that defines an illumination beam path and a detection beam path and being arranged in both the illumination beam path and the detection beam path, an interchangeable module arranged in the illumination beam path and detection beam path that separates the illumination beam path and detection beam path at a fixed angular relationship to one another and that comprises at least a first acoustooptical component A further object of the invention is to describe an optical element that is universally usable for the separation of illuminating and detected light beams.

This object is achieved by an optical element having at least three ports, such that at a first port an illuminating light beam can be coupled in, at a second port the illuminating light beam can be coupled out and a detected light beam can be coupled in, and at a third port the detected light beam can be coupled out, whereby the optical element contains at least a first acoustooptical component and is configured as an interchangeable module.

The invention has, in addition to the advantage of retrofittability, the further advantage of universal variability of the power level of the illuminating light of at least one arbitrarily selectable wavelength or at least one arbitrarily selectable wavelength region, also making possible low-loss reflection microscopy.

In a preferred embodiment of the scanning microscope, the acoustooptical component is configured as an acoustooptical tunable filter (AOTF). An embodiment having an acoustooptical deflector (AOD) can be implemented.

In another embodiment according to the present invention, an optical compensation element that compensates for a double refraction of the acoustooptical component, which results in a polarization-dependent spatial division of the detected light beam, is provided. The double-refraction properties are attributable to the crystal structure of the acoustooptical component. Because of the arrangement of their boundary surfaces, many acoustooptical components have an undesired prismatic effect on the detected light that, in a further preferred embodiment, is compensated for by an optical compensation element. The prismatic effect causes a spatially spectral division of the detected light beam. An embodiment in which the optical compensation element compensates both for an undesired prismatic effect and for a double refraction is very particularly advantageous. In this context, the optical compensation element preferably contains a further acoustooptical component. In a very particularly advantageous variant embodiment, the further acoustooptical component and the first acoustooptical component have the same external shape and the same crystal structure. The further acoustooptical component and the first acoustooptical component are oriented rotated 180 degrees from one another with reference to the propagation direction of the detected light beam striking the first acoustooptical component. As a rule, the further acoustooptical component oriented in this fashion is offset laterally with respect to the axis defined by the propagation direction of the detected light beam striking the first acoustooptical component, so that the detected light beam strikes the further acoustooptical component. In this embodiment, the spacing of the first acoustooptical component from the further acoustooptical component is selected to be as small as possible in order to prevent excessive spatial division of the detected light beam between the acoustooptical component and the further acoustooptical component. Spatial divisions on the order of half a beam diameter are acceptable.

In another embodiment, the further acoustooptical component is cemented, directly or via an intermediate component, to the first acoustooptical component.

The optical module preferably contains elements for beam guidance and elements for beam shaping. These are, for example, lenses, mirrors, gratings, concave mirrors, and glass blocks. Provision is made, in particular, for compensation for a beam offset or beam deviation created upon passage through the acoustooptical component.

In another embodiment, provision is made for temperature stabilization of the first acoustooptical component and the second acoustooptical component. In a further variant embodiment, in order to eliminate disadvantages due to temperature fluctuations or fluctuations in the wavelength of the illuminating light beam, provision is made for controlling the high frequency in open- or closed-loop fashion as a function of the temperature. Another variant provides, in order to realize this goal, for controlling the wavelength of the illuminating light beam in open- or closed-loop fashion as a function of the temperature.

In a preferred embodiment, a line multiplex is provided, a specimen being scanned several times but always with illuminating light of a different wavelength. An (automatic) switchover of the wavelength of the illuminating light for successive specimen lines is also possible.

In a very particularly preferred embodiment, guidance and banking elements for positioning the module are provided. These contain, for example, slide bars, dovetail guides, or a bayonet mount, which make possible simple and reliable introduction and positioning. Also provided are banking elements which define a working position of the module in the illumination and detection beam path and are configured so that the positioned coupling-out element is automatically aligned with respect to the detection beam path, and so that no further alignment of the coupling-out element is necessary after positioning.

In another embodiment, a revolving turret or a sliding carriage, which comprises at least one element receptacle, is provided for positioning of the module, the module being mounted on or in the element receptacle in such a way that the module can be positioned in the illumination and detection beam path by simply rotating the revolving turret or by sliding the sliding carriage. Alignment of the module is accomplished only once upon mounting of the module in or on the revolving turret or sliding carriage. The latter preferably comprises a snap-in apparatus that releasably immobilizes the revolving turret or sliding carriage when the module is positioned in the illumination and detection beam path. In a further variant embodiment, the revolving turret or sliding carriage comprises multiple element receptacles in which beam splitters, which are embodied as dichroic beam splitters, neutral splitters, or color beam splitters, are mounted. This approach according to the present invention is highly flexible, since the module and multiple different beam splitters of differing spectral properties can be held in readiness and easily interchanged.

In a particularly advantageous embodiment, the illuminating beam path coupled out of the module and the detected light beam coupled out of the module have parallel optical axes. This embodiment simplifies exchangeability with beam splitters based on plane-parallel substrates.

BRIEF DESCRIPTION OF THE DRAWINGS

The subject matter of the invention is depicted schematically in the drawings and will be described below with reference to the Figures, identically functioning elements being labeled with the same reference characters. In the drawings.

DETAILED DESCRIPTION OF THE INVENTION

Figure 1:
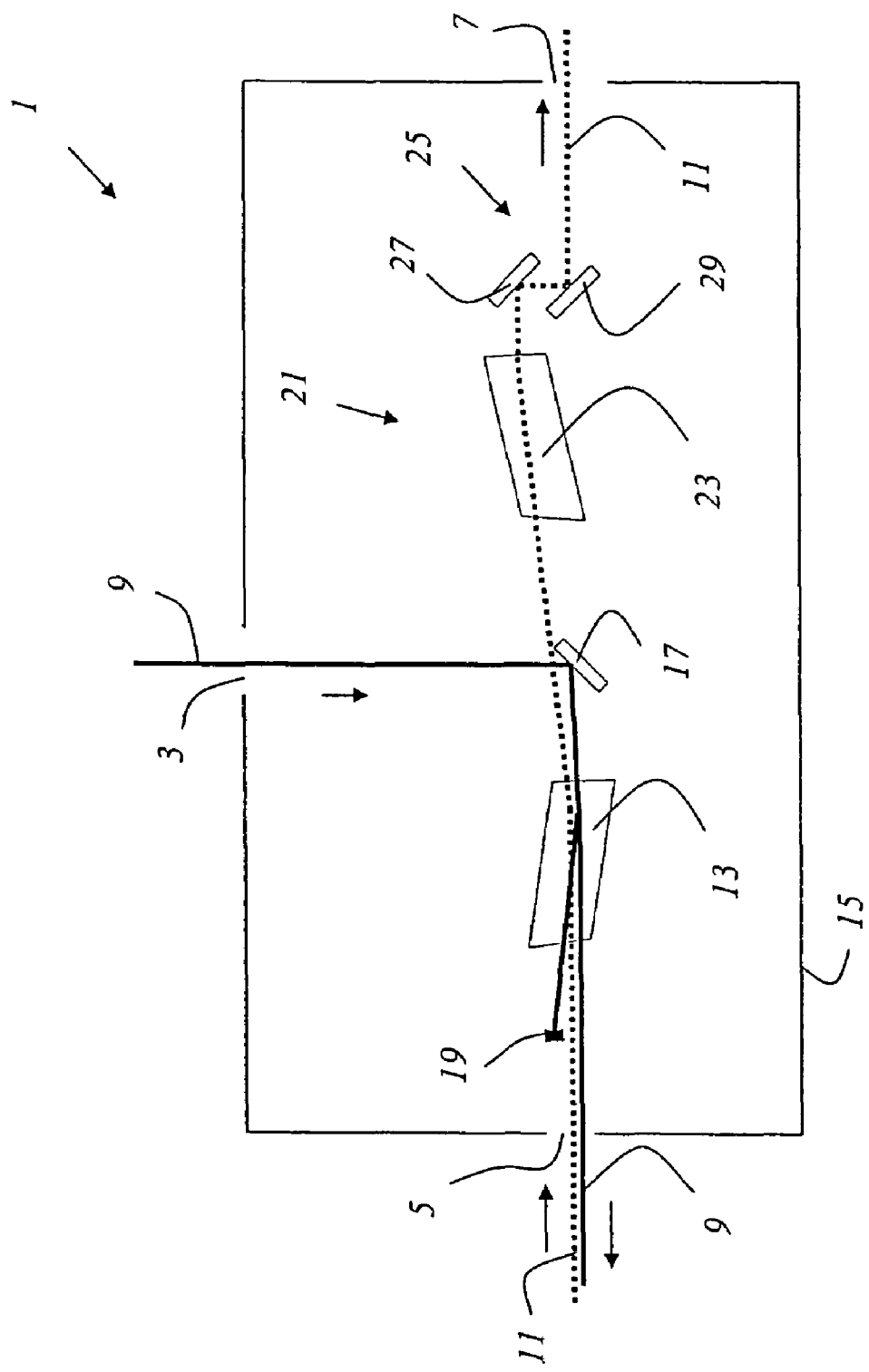
FIG. 1 shows an optical element according to the present invention.

FIG. 1 shows an optical element 1 according to the present invention. Optical element 1 comprises a first port 3, a second port 5, and a third port 7; at the first port 3 an illuminating light beam 9 is coupled in, at the second port 5 illuminating light beam 9 is coupled out and a detected light beam 11 is coupled in, and at the third port 7 detected light beam 11 is coupled out. Optical element 1 contains a first acoustooptical component 13 and is configured as an interchangeable module having a housing 15. The incident illuminating light beam 9 is directed by a deflection mirror 17 onto first acoustooptical component 13. Acoustooptical component 13 is configured as an AOTF that is traversed by an acoustic wave. The acoustic wave is generated by an electrically activated piezoacoustic generator. The frequency of the acoustic wave is selected so that only those components of illuminating light beam 9 of the desired wavelength are directed toward second port 5. The other components of illuminating light beam 9 not influenced by the acoustic excitation are directed into a beam trap 19. The power level of illuminating light beam 9 emerging from second port 5 can be selected by varying the amplitude of the acoustic wave; this is particularly advantageous in particular for applications in reflection microscopy. The crystal sectioning and orientation of acoustooptical component 13 are selected so that for the same coupling-in direction, different wavelengths are deflected in the same direction.

Optical element 1 makes it possible to vary the power level of illuminating light beam 9, to vary the power level of at least one selectable wavelength or at least one selectable wavelength region of illuminating light beam 9, and also to completely block out selectable wavelengths or selectable wavelength regions. Detected light beam 11, which is depicted with dashed lines in the drawings, strikes acoustooptical component 13 in a propagation direction opposite to that of illuminating light beam 9. Those components of detected light beam 11 having the same wavelength and polarization as those of illuminating light beam 9 are completely or partially (depending on the amplitude of the acoustic wave) directed onto deflection mirror 17 and then to first port 3; at decreased amplitude, the uninfluenced portion passes by deflection mirror 17. If detected light beam 11 is, for example, reflected light, optical element 1 then acts as a variable neutral beam splitter whose splitting ratio is determined by the amplitude of the acoustic wave. If detected light beam 11 is fluorescent light whose wavelength is modified, for example, as a result of Stokes or Raman shifting, this light is not influenced by the acoustic wave and passes by deflection mirror 17. Because of the double refraction of acoustooptical component 13, detected light beam 11 is divided into an ordinarily and an extraordinarily polarized beam. In addition, the ordinarily and extraordinarily polarized beams are each also spectrally spread because of the prismatic effect of acoustooptical component 13. An optical compensation element 21, which comprises a further acoustooptical component 23, is provided for compensation. Further acoustooptical component 23 corresponds in its construction to first acoustooptical component 13. It is arranged rotated 180 degrees about the beam axis of 13. As a result, the spread-out subbeams of differing polarization directions are recombined. At the same time, the spectral spreading of first acoustooptical component 13 is annulled. A slight parallel offset for detected light of different wavelengths does, however, remain. After passing through further acoustooptical component 23, detected light 11 strikes a mirror pair made up of a first mirror 27 and a second mirror 29. The purpose of mirror pair 25 is to bring detected light beam 11 onto the desired beam axis, i.e. the beam axis exhibited by detected light beam 11 that enters through second port 5. This simplifies the interchangeability of optical element 1 with an element having a conventional beam splitter. With first acoustooptical component 13 or also with further acoustooptical component 23, detected light beam 11 (like illuminating light beam 9) can be varied in spectrally selective fashion in terms of its power level.

Figure 2:
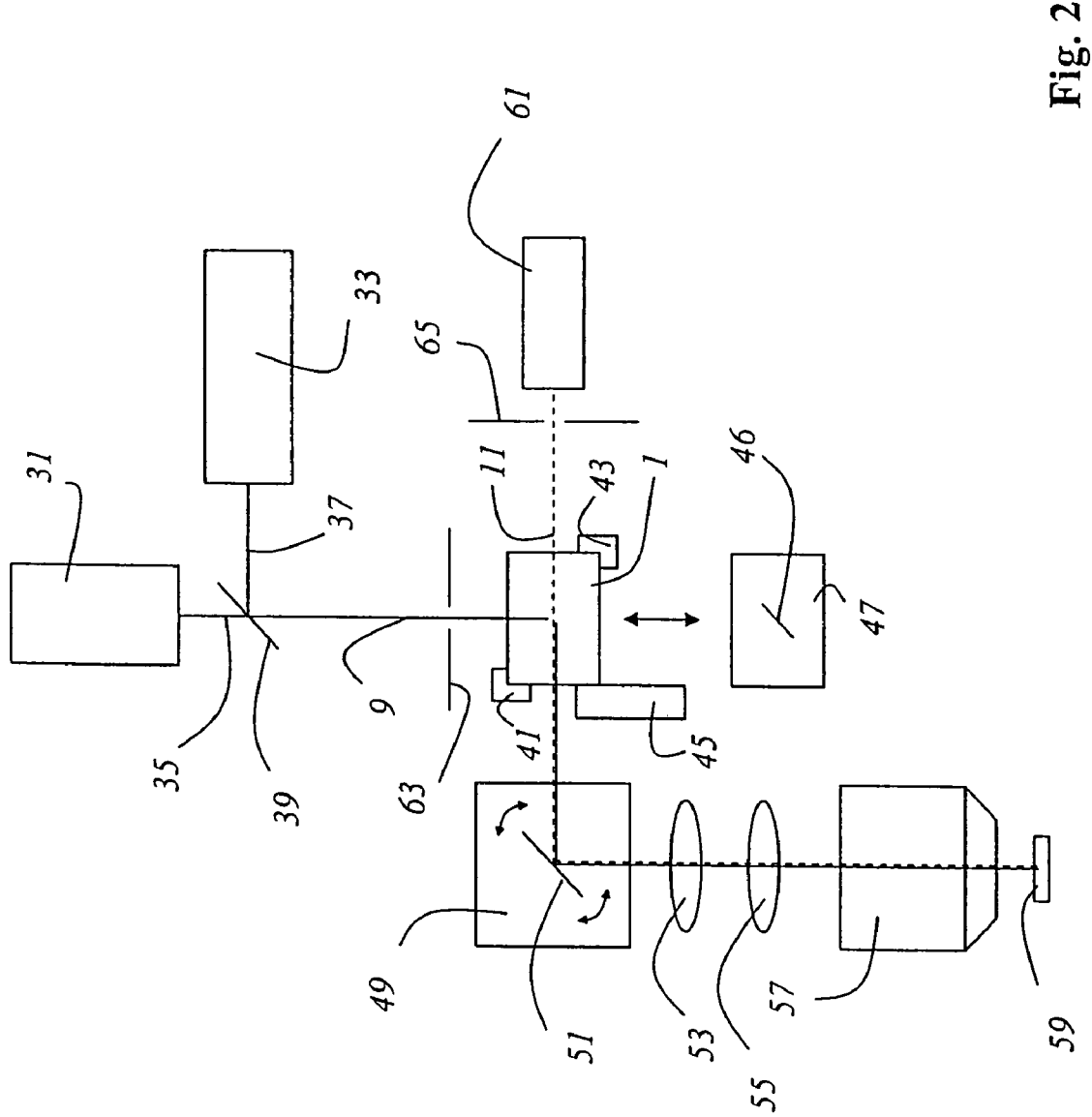
FIG. 2 shows a scanning microscope according to the present invention.

FIG. 2 shows a scanning microscope according to the present invention that is embodied as a confocal scanning microscope, having two lasers 31, 33 whose emitted light beams 35, 37, which have different wavelengths, are combined with dichroic beam combiner 39 into one illuminating light beam 9. The scanning microscope comprises banking elements 41, 43 which define a working position for an optical element 1 and a further optical element 47 that can be selectably introduced into said working position, and which make possible positioning with no need for alignment. Also provided is a guide element 45 that is embodied as a dovetail guide. Optical element 1 corresponds to the optical element illustrated in FIG. 1. Further optical element 47 contains a dichroic beam splitter 46 for separating the illumination and detection beam paths. The particular optical element introduced into the working position directs the influenced or uninfluenced illuminating light beam 9 to a beam deflection device 49 that contains a gimbal-mounted scanning mirror 51 and guides illuminating light beam 9 through scanning optical system 53, tube optical system 55, and objective 57 over or through specimen 59. Detected light beam 11 coming from the specimen travels in the opposite direction through scanning optical system 53, tube optical system 55, and objective 57, and arrives via scanning mirror 51 at optical element 1, 47, which conveys detected light beam 11 to detector 61, which is embodied as a multi-band detector. Illumination pinhole 63 and detection pinhole 65 that are usually provided in a confocal scanning microscope are schematically drawn in for the sake of completeness. Omitted in the interest of better clarity, however, are certain optical elements for guiding and shaping the light beams, as well as the drivers and connecting leads for the acoustooptical components. These are sufficiently familiar to the person skilled in this art.

Figure 3:
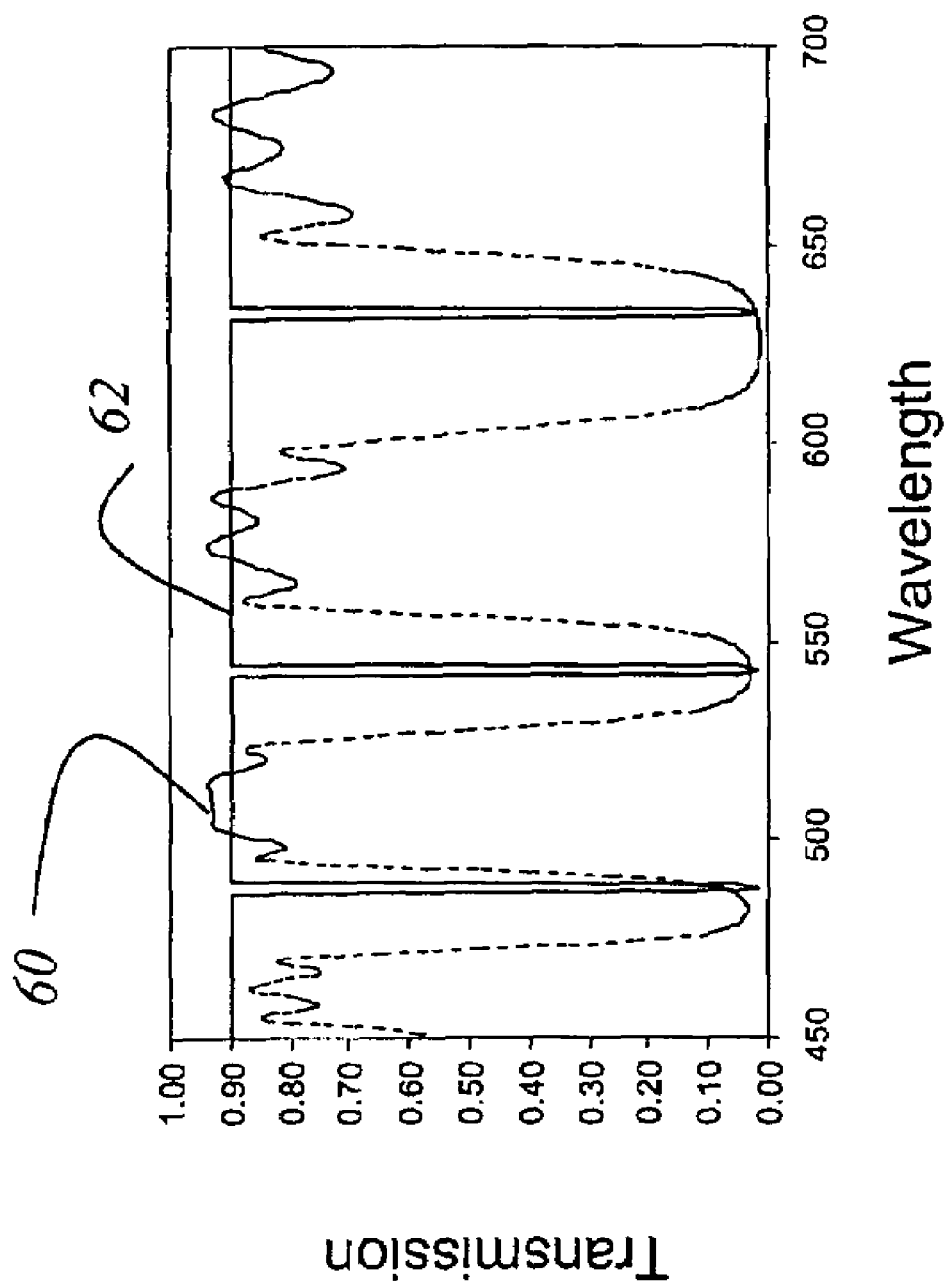
FIG. 3 graphically shows the spectral properties of two optical elements.

FIG. 3 graphically shows the spectral properties of an optical element having a dichroic beam splitter, compared to an optical element having an acoustooptical component. The beam splitter is a triple dichroic optimized for the excitation wavelengths 488 nm, 543 nm, and 633 nm. A high reflectivity and correspondingly low transmission is required for these wavelengths. For efficient fluorescence detection, high transmission in the remaining wavelength region above the excitation lines is required. The detectable fluorescent light power level is obtained by integrating the product of the beam splitter transmission and the fluorescence spectrum over the wavelength region of interest. The transmission spectrum of an optical element having an acoustooptical component set to the same excitation wavelengths (488 nm, 543 nm, 633 nm) is also depicted.

Figure 4:
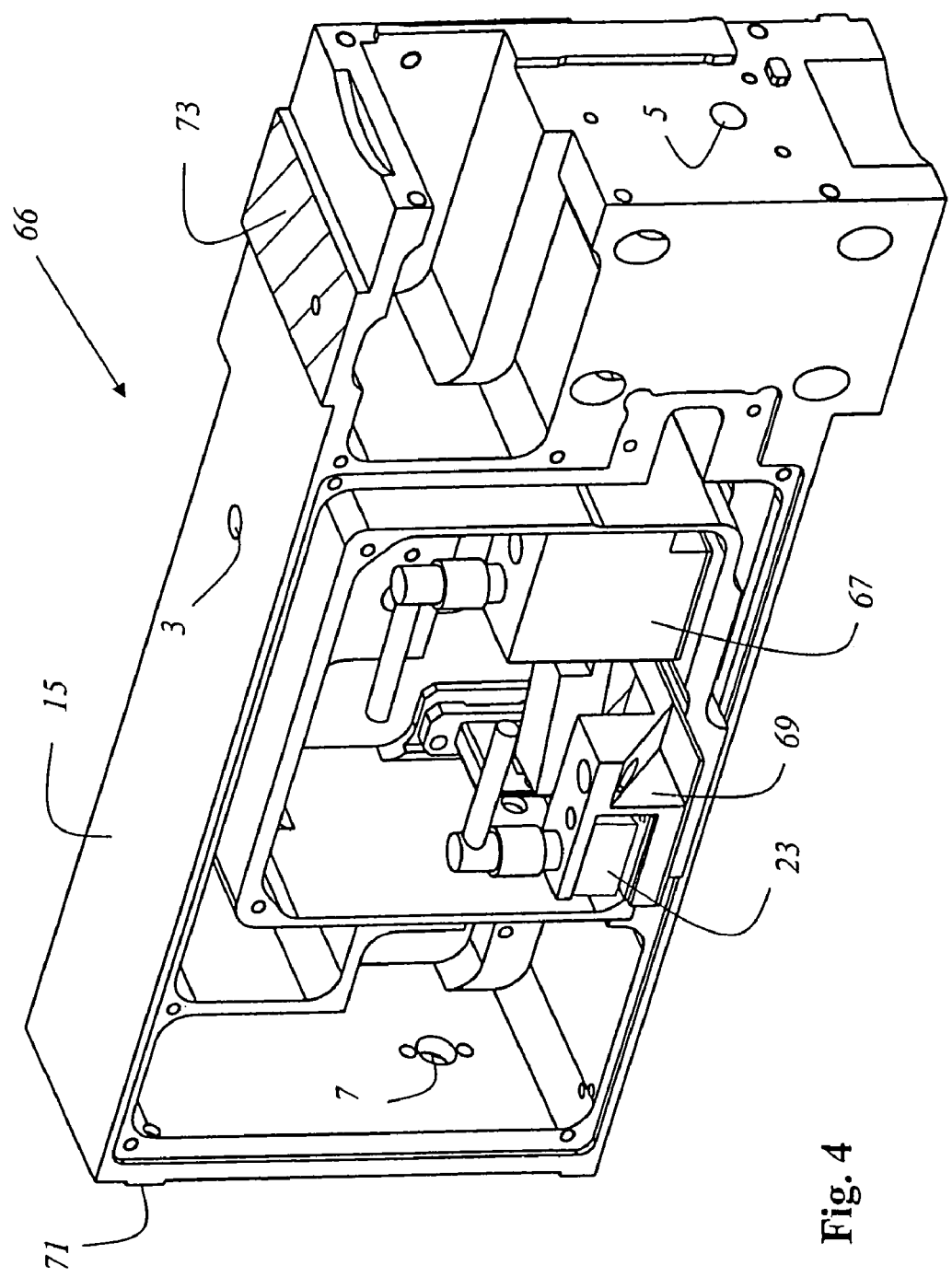
FIG. 4 shows an optical element according to the present invention.

FIG. 4 shows a module 66 according to the present invention having a first acoustooptical component that in this view is covered by its mount 67, and having a further acoustooptical component 23 that is arranged in a mount 69. The module comprises a housing 15, a first port 3, a second port 5, and a third port 7; at first port 3 an illuminating light beam 9 is coupled in, at second port 5 illuminating light beam 9 is coupled out and a detected light beam 11 is coupled in, and at third port 7 detected light beam 11 is coupled out. Banking (locating) surfaces 71, 73 for exact positioning are also provided. The module can be introduced easily and without alignment effort into an optical device, for example a scanning microscope or a flow-through cytometer, and can be interchanged, for example, with the optical element shown in FIG. 5.

Figure 5:
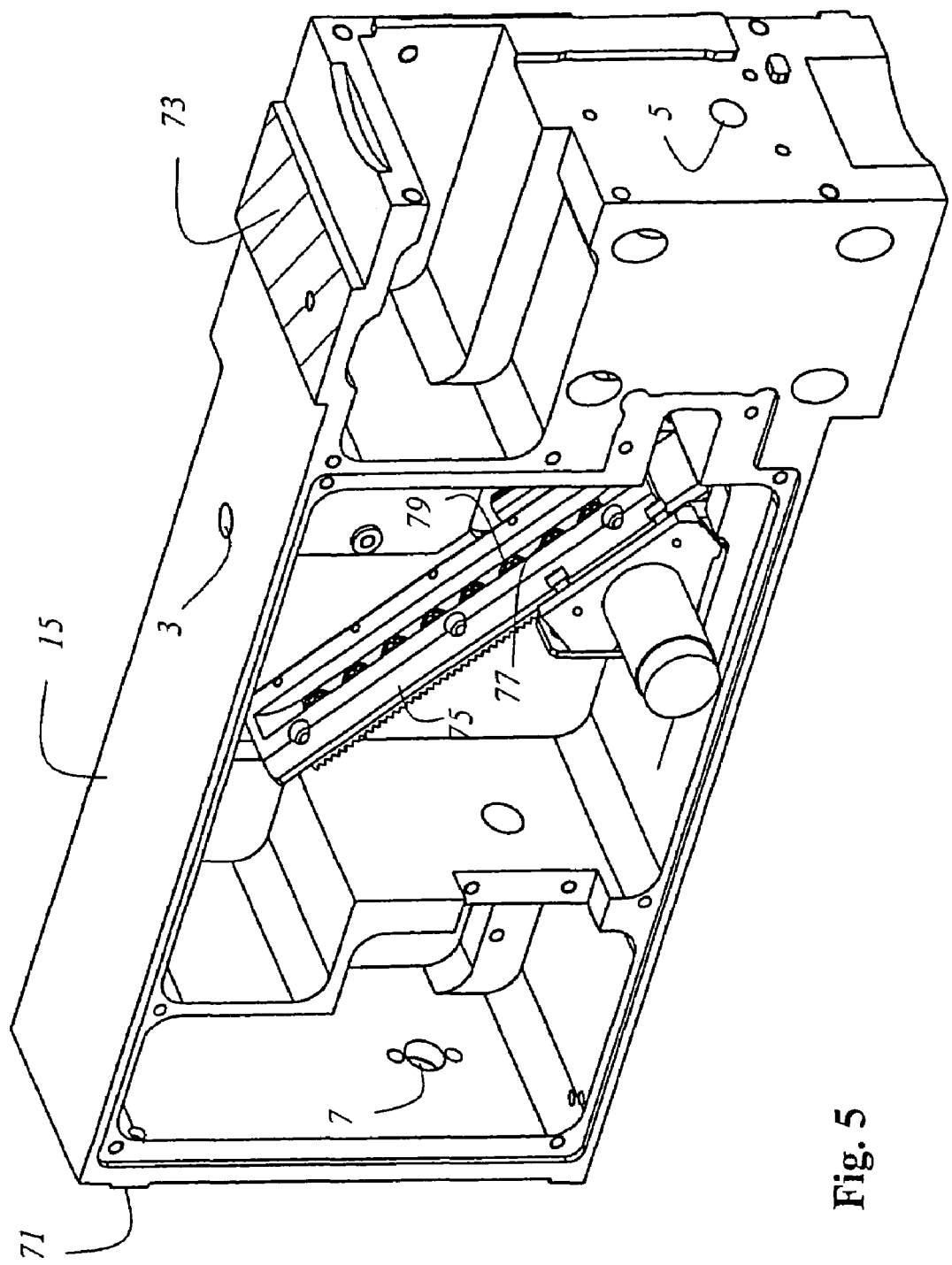
FIG. 5 shows a further optical element.

FIG. 5 shows an optical element that is equipped with a sliding carriage 75 in which multiple beam splitters 77, 79 are stocked, and whose housing 15 has the same form as the module shown in FIG. 4. The optical element can be introduced easily and without alignment effort into an optical device, for example a scanning microscope or a flow-through cytometer, and can be interchanged, for example, with the optical element shown in FIG. 4.

The invention has been described with reference to a particular exemplary embodiment. It is nevertheless self-evident that changes and modifications can be made without thereby leaving the range of protection of the claims below.

What is claimed is:

1. A scanning microscope comprising:
   an objective that defines an illumination beam path and a detection beam path and being arranged in both the illumination beam path and the detection beam path;
   an interchangeable module arranged in the illumination beam path and detection beam path that separates the illumination beam path and detection beam path at a fixed angular relationship to one another and that comprises at least a first acoustooptical component; and
   an optical compensation element that compensates for a double refraction and a prismatic effect of the acoustooptical component;
   wherein the optical compensation element contains a further acoustooptical component; and
   wherein the further acoustooptical component and the first acoustooptical component are oriented rotated 180 degrees from one another with reference to the propagation direction of the detected light beam striking the first acoustooptical component.

2. The scanning microscope as defined in claim 1, wherein the acoustooptical component is an acoustooptical tunable filter (AOTF) or an acoustooptical deflector (AOD).

3. A scanning microscope comprising:
   an objective that defines an illumination beam path and a detection beam path and being arranged in both the illumination beam path and the detection beam path;
   an interchangeable module arranged in the illumination beam path and detection beam path that separates the illumination beam path and detection beam path at a fixed angular relationship to one another and that comprises at least a first acoustooptical component; and
   an optical compensation element that compensates for a double refraction and a prismatic effect of the acoustooptical component;
   wherein the optical compensation element contains a further acoustooptical component; and
   wherein the spacing of the further acoustooptical component from the first acoustooptical component is so small that a spectral division, caused by the first acoustooptical component, of a detected light bundle propagating along the detection beam path is smaller, at the further acoustooptical component, than half the diameter of the undivided detected light bundle.

4. The scanning microscope as defined in claim 1, wherein the further acoustooptical component is cemented to the first acoustooptical component.

5. The scanning microscope as defined in claim 1, wherein the module contains elements for beam guidance and/or beam shaping.

6. The scanning microscope as defined in claim 1, wherein guide elements and banking elements for positioning the module are provided.

7. The scanning microscope as defined in claim 3, wherein the acoustooptical component is an acoustooptical tunable filter (AOTF) or an acoustooptical deflector (AOD).

8. The scanning microscope as defined in claim 3, wherein the further acoustooptical component is cemented to the first acoustooptical component.

9. The scanning microscope as defined in claim 3, wherein the module contains elements for beam guidance and/or beam shaping.

10. The scanning microscope as defined in claim 3, wherein guide elements and banking elements for positioning the module are provided.

* * * * *